(12) United States Patent
Cho et al.

(10) Patent No.: US 9,863,502 B2
(45) Date of Patent: Jan. 9, 2018

(54) AUTOMOTIVE MULTISTAGE TRANSMISSION

(71) Applicant: HYUNDAI MOTOR COMPANY, Seoul (KR)

(72) Inventors: Won Min Cho, Hwaseong-si (KR); Jae Chang Kook, Hwaseong-si (KR); Myeong Hoon Noh, Seongnam-si (KR); Seong Wook Ji, Ansan-si (KR); Kang Soo Seo, Yongin-si (KR); Seong Wook Hwang, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 218 days.

(21) Appl. No.: 14/793,321

(22) Filed: Jul. 7, 2015

(65) Prior Publication Data

US 2016/0230847 A1 Aug. 11, 2016

(30) Foreign Application Priority Data

Feb. 9, 2015 (KR) ........................ 10-2015-0019687

(51) Int. Cl.
*F16H 3/62* (2006.01)
*F16H 3/44* (2006.01)
*F16H 37/06* (2006.01)
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
CPC ................. F16H 2200/2012; F16H 2200/2046
See application file for complete search history.

(56) References Cited

U.S. PATENT DOCUMENTS

| 8,303,455 | B2 | 5/2012 | Gumpoltsberger et al. |
| 8,574,113 | B1 * | 11/2013 | Goleski ................... F16H 3/66 |
| | | | 475/282 |
| 8,888,648 | B2 * | 11/2014 | Mellet ...................... F16H 3/66 |
| | | | 475/275 |
| 9,347,529 | B1 * | 5/2016 | Cho ......................... F16H 3/66 |
| 9,512,905 | B2 * | 12/2016 | Muller .................... F16H 3/666 |
| 9,625,007 | B2 * | 4/2017 | Long ........................ F16H 3/66 |
| 9,638,286 | B2 * | 5/2017 | Cho ......................... F16H 3/66 |
| 2012/0231917 | A1 | 9/2012 | Phillips et al. |

FOREIGN PATENT DOCUMENTS

| JP | 2015-505355 | 12/2015 |
| KR | 10-1063505 | 9/2011 |
| KR | 10-2013-0077146 | 7/2013 |
| WO | 2013/100620 A1 | 7/2013 |

* cited by examiner

*Primary Examiner* — Tisha Lewis
(74) *Attorney, Agent, or Firm* — Brinks Gilson & Lione

(57) ABSTRACT

An automotive multistage transmission includes four planetary gear sets and six shifting members, and each of the planetary gear sets include three rotary members selectively connected to the six shifting members to transmit torque between input and output shafts, so that the automotive multistage transmission provides ten or more forward shifting stages and one or more rearward shifting stages with few parts and a simple configuration. With this arrangement, the transmission can improve fuel efficiency of a vehicle.

13 Claims, 3 Drawing Sheets

| SHIFTING STAGE | CL1 | CL2 | CL3 | CL4 | CL5 | CL6 | GEAR RATIO |
|---|---|---|---|---|---|---|---|
| 1ST | O | | | O | | O | 5.000 |
| 2ND | O | | | O | O | | 3.154 |
| 3RD | | | | O | O | O | 2.343 |
| 4TH | | O | | O | O | | 2.050 |
| 5TH | | O | | O | | O | 1.900 |
| 6TH | | O | | | O | O | 1.000 |
| 7TH | | O | O | | | O | 0.400 |
| 8TH | | O | O | | O | | 0.300 |
| 9TH | | | O | | O | O | 0.277 |
| 10TH | O | | O | | O | | 0.243 |
| REV | O | | O | O | | | 3.000 |

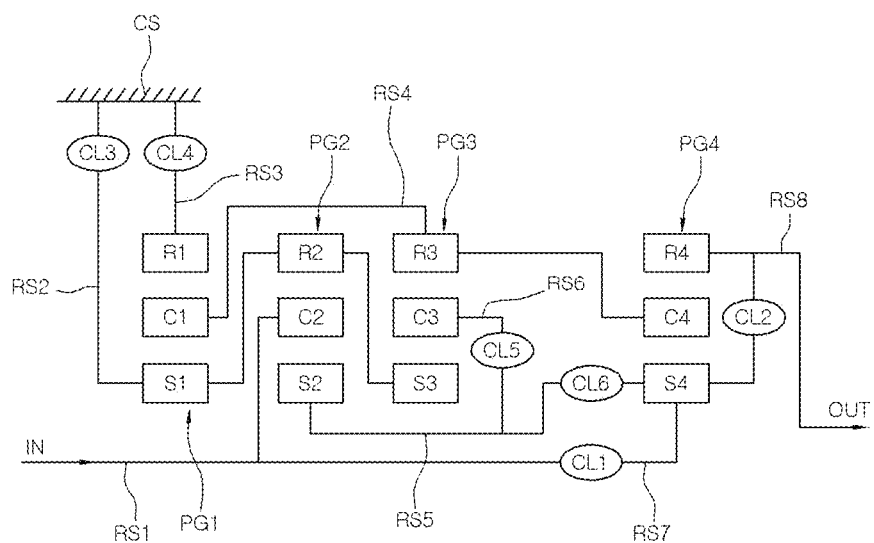

| SHIFTING STAGE | CL1 | CL2 | CL3 | CL4 | CL5 | CL6 | GEAR RATIO |
|---|---|---|---|---|---|---|---|
| 1ST | O | | | O | | O | 6.250 |
| 2ND | O | | | O | O | | 3.750 |
| 3RD | | | | O | O | O | 2.625 |
| 4TH | | O | | O | O | | 2.100 |
| 5TH | | O | | O | | O | 1.900 |
| 6TH | | O | | | O | O | 1.000 |
| 7TH | | O | O | | | O | 0.400 |
| 8TH | | O | O | | O | | 0.267 |
| 9TH | | | O | | O | O | 0.235 |
| 10TH | O | | O | | O | | 0.206 |
| REV | O | | O | O | | | 2.500 |

AUTOMOTIVE MULTISTAGE TRANSMISSION

CROSS REFERENCE TO RELATED APPLICATION(S)

This application claims the benefit of Korean Patent Application No. 10-2015-0019687, filed on Feb. 9, 2015, which is hereby incorporated by reference herein in its entirety.

FIELD

The present disclosure relates to an automotive multistage transmission.

BACKGROUND

The statements in this section merely provide background information related to the present disclosure and may not constitute prior art.

Recently, a rise in oil prices has caused manufacturers all over the world to rush into infinite competition. For engines in particular, manufacturers have been trying to reduce the weight and improve fuel efficiency through downsizing and similar measures.

Alternatively, as a method capable of improving fuel efficiency through the transmission in a vehicle, there is a method of operating an engine at a more efficient operation point by increasing the shifting stages of the transmission, thereby improving fuel efficiency.

Increasing the shifting stages of the transmission enables an engine to operate in a relatively lower range of RPM, so a vehicle can run more quietly.

However, as the shifting stages of a transmission increase, the number of parts in the transmission increases, so the manufacturing cost, weight, and power transmission efficiency may become poor.

SUMMARY

The present disclosure provides an automotive multistage transmission that can improve fuel efficiency of a vehicle as much as possible by operating an engine at the desired operation point and that can drive a vehicle more quietly by operating an engine more silently, by achieving ten or more forward shifting stages and one or more rearward shifting stages with fewer parts and a simpler configuration than in the conventional art.

According to one aspect of the present disclosure, there is provided an automotive multistage transmission that includes: an input shaft and an output shaft; a first planetary gear set, a second planetary gear set, a third planetary gear set, and a fourth planetary gear set, each of the planetary gear sets including three rotary members and thus configured, structured and/or arranged for transmitting torque between the input shaft and the output shaft; and at least six shifting members connected to the rotary members of the planetary gear sets, in which in the first planetary gear set, a first rotary member stays connected to a third rotary member of the second planetary gear set and is selectively fixable to any one of the shifting members, a second rotary member stays connected to a third rotary member of the third planetary gear set, and a third rotary member is selectively fixable to another one of the shifting members, in the second planetary gear set, a first rotary member is variably connected to a second rotary member of the third planetary gear set and a first rotary member of the fourth planetary gear set, a second rotary member stays connected to the input shaft and is variably connected to the first rotary member of the fourth planetary gear set, and the third rotary member stays connected to a first rotary member of the third planetary gear set, the third rotary member of the third planetary gear set stays connected to a second rotary member of the fourth planetary gear set, and a third rotary member of the fourth planetary gear set stays connected to the output shaft.

According to another aspect of the present disclosure, there is provided an automotive multistage transmission that includes: a first planetary gear set, a second planetary gear set, a third planetary gear set, and a fourth planetary gear set each including three rotary members; six shifting members variably providing a friction force; and eight rotary shafts connected to the rotary members of the planetary gear sets, in which a first rotary shaft is an input shaft directly connected to a second rotary member of the second planetary gear set, a second rotary shaft is directly connected to a first rotary member of the first planetary gear set, a third rotary member of the second planetary gear set, and a first rotary member of the third planetary gear set, a third rotary shaft is directly connected to a third rotary member of the first planetary gear set, a fourth rotary shaft is directly connected to a second rotary member of the first planetary gear set, a third rotary member of the third planetary gear set, and a second rotary member of the fourth planetary gear set; a fifth rotary shaft is directly connected to a first rotary member of the secondary planetary gear set, a sixth rotary shaft is directly connected to a second rotary member of the third planetary gear set, a seventh rotary shaft is directly connected to a first rotary member of the fourth planetary gear set, and an eighth rotary shaft is an output shaft directly connected to a third rotary member of the fourth planetary gear set; and in which, in the six shifting members, a first clutch is disposed between the first rotary shaft and the seventh rotary shaft, a second clutch is disposed between the fourth rotary shaft and the eighth rotary shaft, a third clutch is disposed between the second rotary shaft and a transmission case, a fourth clutch is disposed between the third rotary shaft and the transmission case, a fifth clutch is disposed between the fifth rotary shaft and the sixth rotary shaft, and a sixth clutch is disposed between the fifth rotary shaft and the seventh rotary shaft.

According to a further aspect of the present disclosure, there is provided an automotive multistage transmission that includes: a first planetary gear set, a second planetary gear set, a third planetary gear set, and a fourth planetary gear set each including three rotary members; six shifting members variably providing a friction force; and eight rotary shafts connected to the rotary members of the planetary gear sets, in which a first rotary shaft is an input shaft directly connected to a second rotary member of the second planetary gear set, a second rotary shaft is directly connected to a first rotary member of the first planetary gear set, a third rotary member of the second planetary gear set, and a first rotary member of the third planetary gear set, a third rotary shaft is directly connected to a third rotary member of the first planetary gear set, a fourth rotary shaft is directly connected to a second rotary member of the first planetary gear set, a third rotary member of the third planetary gear set, and a second rotary member of the fourth planetary gear set; a fifth rotary shaft is directly connected to a first rotary member of the secondary planetary gear set, a sixth rotary shaft is directly connected to a second rotary member of the third planetary gear set, a seventh rotary shaft is directly connected to a first rotary member of the fourth planetary gear set, and an eighth rotary shaft is an output shaft directly connected to a third rotary member of the fourth planetary gear set; and in which, in the six shifting members, a first clutch is disposed between the first rotary shaft and the seventh rotary shaft, a second clutch is disposed between the seventh rotary shaft and the eighth rotary shaft, a third clutch is disposed between the second rotary shaft and a transmission case, a fourth clutch is disposed between the third rotary shaft and the transmission case, a fifth clutch is disposed between the fifth rotary shaft and the sixth rotary shaft, and a sixth clutch is disposed between the fifth rotary shaft and the seventh rotary shaft.

According to still another aspect of the present disclosure, there is provided an automotive multistage transmission that includes: a first planetary gear set, a second planetary gear set, a third planetary gear set, and a fourth planetary gear set each including three rotary members; six shifting members variably providing a friction force; and eight rotary shafts connected to the rotary members of the planetary gear sets, in which a first rotary shaft is an input shaft directly connected to a second rotary member of the second planetary gear set, a second rotary shaft is directly connected to a first rotary member of the first planetary gear set, a third rotary member of the second planetary gear set, and a first rotary member of the third planetary gear set, a third rotary shaft is directly connected to a third rotary member of the first planetary gear set, a fourth rotary shaft is directly connected to a second rotary member of the first planetary gear set, a third rotary member of the third planetary gear set, and a second rotary member of the fourth planetary gear set; a fifth rotary shaft is directly connected to a first rotary member of the secondary planetary gear set, a sixth rotary shaft is directly connected to a second rotary member of the third planetary gear set, a seventh rotary shaft is directly connected to a first rotary member of the fourth planetary gear set, and an eighth rotary shaft is an output shaft directly connected to a third rotary member of the fourth planetary gear set; and in which, in the six shifting members, a first clutch is disposed between the first rotary shaft and the seventh rotary shaft, a second clutch is disposed between the fourth rotary shaft and the seventh rotary shaft, a third clutch is disposed between the second rotary shaft and a transmission case, a fourth clutch is disposed between the third rotary shaft and the transmission case, a fifth clutch is disposed between the fifth rotary shaft and the sixth rotary shaft, and a sixth clutch is disposed between the fifth rotary shaft and the seventh rotary shaft.

According to the present disclosure, it is possible to improve fuel efficiency of a vehicle as much as possible by operating an engine at a desired operation point and that can drive a vehicle more quietly by operating an engine more silently, by achieving ten or more forward shifting stages and one or more rearward one shifting stages with fewer parts and a simpler configuration than in the conventional art.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is a diagram showing the configuration of an automotive multistage transmission according to a second form of the present disclosure;

FIG. 4 is a table showing operation modes of the transmission shown in FIG. 3;

Figures 1, 2:
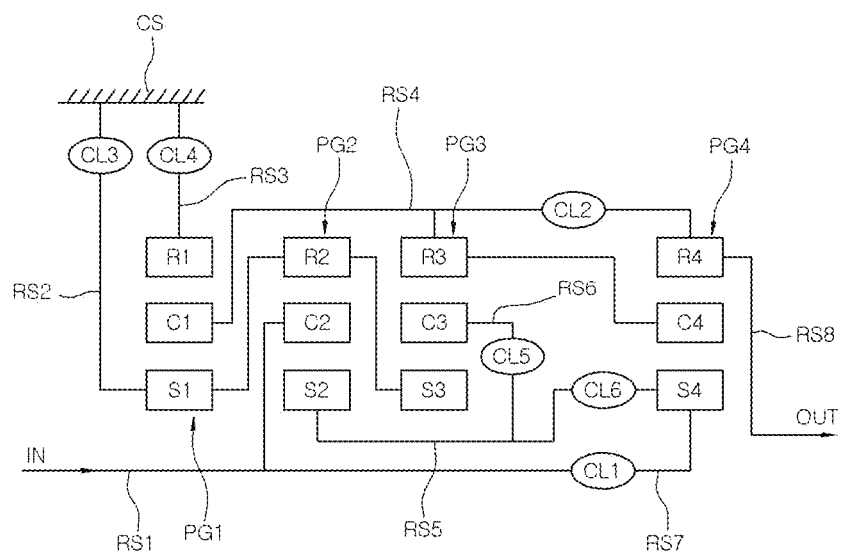
FIG. 1 is a diagram showing the configuration of an automotive multistage transmission according to a first form of the present disclosure.
FIG. 2 is a table showing operation modes of the transmission shown in FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figures 5, 6:
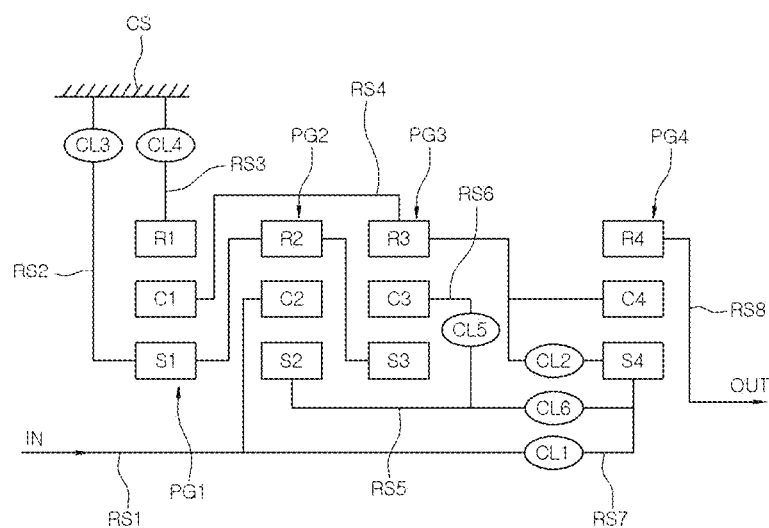
FIG. 5 is a diagram showing the configuration of an automotive multistage transmission according to a third form of the present disclosure.
FIG. 6 is a table showing operation modes of the transmission shown in FIG. 5.

Referring to FIGS. 1, 3, and 5, forms of the present disclosure, in common, include: an input shaft "IN" and an output shaft "OUT"; a first planetary gear set "PG1", a second planetary gear set "PG2," a third planetary gear set "PG3," and a fourth planetary gear set "PG4," each of the planetary gear sets including three rotary members, transmitting torque between the input shaft "IN" and the output shaft "OUT"; and at least six shifting members (e.g. clutches CL1-CL6) connected to the rotary members of the planetary gear sets.

As for the first planetary gear set PG1, a first rotary member S1 stays connected (e.g. is permanently engaged) to a third rotary member R2 of the second planetary gear set PG2 and is fixable to any one of the shifting members, a second rotary member C1 stays connected to a third rotary member R3 of the third planetary gear set PG3, and a third rotary member R1 is fixable to another one of the shifting members.

As for the second planetary gear set PG2, a first rotary member S2 is variably connected (e.g. selectively, intermittently connected) to a second rotary member C3 of the third planetary gear set PG3 and a first rotary member S4 of the fourth planetary gear set PG4, a second rotary member C2 stays connected to the input shaft IN and is variably connected to the first rotary member S4 of the fourth planetary gear set PG4, and the third rotary member R2 stays connected to a first rotary member S3 of the third planetary gear set PG3.

The third rotary member R3 of the third planetary gear set PG3 stays connected to a second rotary member C4 of the fourth planetary gear set PG4, and a third rotary member R4 of the fourth planetary gear set PG4 stays connected to the output shaft OUT.

The first planetary gear set PG1, second planetary gear set PG2, third planetary gear set PG3, and fourth planetary gear set PG4 are sequentially arranged in the axial direction of the input shaft IN and the output shaft OUT.

The first rotary member S1 of the first planetary gear set PG1 is fixable to a transmission case CS by a third clutch CL3 of the shifting members and the third rotary member R1 of the first planetary gear set PG1 is fixable to the transmission case CS by a fourth clutch CL4 of the shifting members.

Accordingly, the third clutch CL3 and the fourth clutch CL4 can function as a brake, thereby restricting or allowing rotation of the first rotary member S1 and the third rotary member R1 of the first planetary gear set PG1.

The others of the shifting members form variable connection structures between the rotary members of the planetary gear sets.

That is, a first clutch CL1 of the shifting members forms a variable connection structure between the second rotary member C2 of the second planetary gear set PG2 and the first rotary member S4 of the fourth planetary gear set PG4, a fifth clutch CL5 of the shifting members forms a variable connection structure between the first rotary member S2 of the second planetary gear set PG2 and the second rotary member C3 of the third planetary gear set PG3, and a sixth clutch CL6 of the shifting members forms a variable connection structure between the first rotary member S2 of the second planetary gear set PG2 and the first rotary member S4 of the fourth planetary gear set PG4.

This configuration is applied in common to a first form, a second form, and a third form of the present disclosure, and the differences between the forms of the present disclosure are described below.

In the first form shown in FIG. 1, the third rotary member R3 of the third planetary gear set PG3 and the third rotary member R4 of the fourth planetary gear set PG4 are variably connected, and the second clutch CL2 forms a variable connection structure between the third rotary member R3 of the third planetary gear set PG3 and the third rotary member R4 of the fourth planetary gear set PG4.

In the second form shown in FIG. 3, the first rotary member S4 and the third rotary member R4 of the fourth planetary gear set PG4 are variably connected, and the second clutch CL2 forms a variable connection structure between the first rotary member S4 and the third rotary member R4 of the fourth planetary gear set PG4.

Further, in the third form shown in FIG. 5, the first rotary member S4 and the second rotary member C4 of the fourth planetary gear set PG4 are variably connected, and the second clutch CL2 forms a variable connection structure between the first rotary member S4 and the second rotary member C4 of the fourth planetary gear set PG4.

As a result, the first to third forms are structurally different in light of the position of the second clutch CL2.

In the forms shown in FIGS. 1, 3 and 5, the first rotary member S1, the second rotary member C1, and the third rotary member R1 of the first planetary gear set PG1 are a first sun gear, a first carrier, and a first ring gear, respectively; the first rotary member S2, the second rotary member C2, and the third rotary member R2 of the second planetary gear set PG2 are a second sun gear, a second carrier, and a second ring gear, respectively; the first rotary member S3, the second rotary member C3, and the third rotary member R3 of the third planetary gear set PG3 are a third sun gear, a third carrier, and a third ring gear, respectively; and the first rotary member S4, the second rotary member C4, and the third rotary member R4 of the fourth planetary gear set PG4 are a fourth sun gear, a fourth carrier, and a fourth ring gear, respectively.

Automotive multistage transmissions having these configurations may be expressed as follows.

The first to third forms, in common, include: the first planetary gear set PG1, the second planetary gear set PG2, the third planetary gear set PG3, and the fourth planetary gear set PG4, each of the planetary gear sets including three rotary members, the six shifting members variably providing a friction force; and eight rotary shafts connected to the rotary members of the planetary gear sets.

In those forms, a first rotary shaft RS1 is an input shaft IN directly connected to the second rotary member C2 of the second planetary gear set PG2; a second rotary shaft RS2 is directly connected to the first rotary member S1 of the first planetary gear set PG1 and also connected to the third rotary member R2 of the second planetary gear set PG2 and the first rotary member S3 of the third planetary gear set PG3; a third rotary shaft RS3 is directly connected to the third rotary member R1 of the first planetary gear set PG1; a fourth rotary shaft RS4 connecting the second rotary member C1 of the first planetary gear set PG1 to the third rotary member R3 of the third planetary gear set PG3 and the second rotary member C4 of the fourth planetary gear set PG4; a fifth rotary shaft RS5 is directly connected to the first rotary member S2 of the secondary planetary gear set PG2; a sixth rotary shaft RS6 is directly connected to the second rotary member C3 of the third planetary gear set PG3; a seventh rotary shaft RS7 is directly connected to the first rotary member S4 of the fourth planetary gear set PG4; and an eighth rotary shaft RS8 is an output shaft OUT directly connected to the third rotary member R4 of the fourth planetary gear set PG4.

Further, in the six shifting members, the first clutch CL1 is disposed between the first rotary shaft RS1 and the seventh rotary shaft RS7, the third clutch CL3 is disposed between the second rotary shaft RS2 and the transmission case CS, the fourth clutch CL4 is disposed between the third rotary shaft RS3 and the transmission case CS, the fifth clutch CL5 is disposed between the fifth rotary shaft RS5 and the sixth rotary shaft RS6, and the sixth clutch CL6 is disposed between the fifth rotary shaft RS5 and the seventh rotary shaft RS7.

These configurations described above are the same in all the first to third forms, but there is a difference in the position of the second clutch CL2. The second clutch CL2 is disposed between the fourth rotary shaft RS4 and the eighth rotary shaft RS8 in the first form, between the seventh rotary shaft RS7 and the eighth rotary shaft RS8 in the second form, and between the fourth rotary shaft RS4 and the seventh rotary shaft RS7 in the third form.

The forms of an automotive multistage transmission of the present disclosure, which include four single planetary gear sets and six shifting members, achieve ten forward shifting stages and one rearward shifting stage in accordance with the operation mode tables, as shown in FIGS. 2, 4, and 6, respectively. That is, they can achieve the ten shifting stages with relatively fewer parts and simpler configurations than in the conventional art. Therefore, it is possible to contribute to contribute to quiet driving and improvement of fuel efficiency of a vehicle, resulting in improvement of the commercial value of the vehicle.

Although the present disclosure was described with reference to specific forms shown in the drawings, it is apparent to those skilled in the art that the present disclosure may be changed and modified in various ways without departing from the scope of the present disclosure.

What is claimed is:
1. An automotive multistage transmission comprising:
an input shaft and an output shaft;
a first planetary gear set, a second planetary gear set, a third planetary gear set and a fourth planetary gear set, each of the first, second, third and fourth planetary gear sets comprising first, second and third rotary members configured to transmit torque between the input shaft and the output shaft; and at least six shifting members, each shifting member connected to at least one of the first, second and third rotary members of the first, second, third and fourth planetary gear sets, wherein in the first planetary gear set, the first rotary member of the first planetary gear set stays connected to a third rotary member of the second planetary gear set and is selectively fixable to one shifting member of said at least six shifting members, the second rotary member of the first planetary gear set stays connected to the third rotary member of the third planetary gear set, and the third rotary member of the first planetary gear set is fixable to another one of said at least six shifting members, wherein in the second planetary gear set, the first rotary member is variably connected to the second rotary member of the third planetary gear set and the first rotary member of the fourth planetary gear set, the second rotary member stays connected to the input shaft and is variably connected to the first rotary member of the fourth planetary gear set, and the third rotary member stays connected to the first rotary member of the third planetary gear set, and wherein the third rotary member of the third planetary gear set stays connected to the second rotary member of the fourth planetary gear set, and wherein the third rotary member of the fourth planetary gear set stays connected to the output shaft.

2. The automotive multistage transmission according to claim 1, wherein the third rotary member of the third planetary gear set and the third rotary member of the fourth planetary gear set are variably connected.

3. The automotive multistage transmission according to claim 1, wherein the first rotary member and the third rotary member of the fourth planetary gear set are variably connected.

4. The automotive multistage transmission according to claim 1, wherein the first rotary member and the second rotary member of the fourth planetary gear set are variably connected.

5. The automotive multistage transmission according to claim 1, wherein the first planetary gear set, the second planetary gear set, the third planetary gear set, and the fourth planetary gear set are sequentially arranged in an axial direction of the input shaft and the output shaft.

6. The automotive multistage transmission according to claim 5, wherein the first rotary member of the first planetary gear set is selectively fixable to a transmission case by a third clutch of said at least six shifting members, the third rotary member of the first planetary gear set is selectively fixable to the transmission case by a fourth clutch of said at least six shifting members, and others of said at least six shifting members form variable connection structures between the rotary members of the first, second, third and fourth planetary gear sets.

7. The automotive multistage transmission according to claim 6, wherein a first clutch of said at least six shifting members forms a variable connection structure between the second rotary member of the second planetary gear set and the first rotary member of the fourth planetary gear set, a fifth clutch of said at least six shifting members forms a variable connection structure between the first rotary member of the second planetary gear set and the second rotary member of the third planetary gear set, and a sixth clutch of said at least six shifting members forms a variable connection structure between the first rotary member of the second planetary gear set and the first rotary member of the fourth planetary gear set.

8. The automotive multistage transmission according to claim 7, wherein when the third rotary member of the third planetary gear set and the third rotary member of the fourth planetary gear set are variably connected, a second clutch forms a variable connection structure.

9. The automotive multistage transmission according to claim 7, wherein when the first rotary member and the third rotary member of the fourth planetary gear set are variably connected, a second clutch forms a variable connection structure.

10. The automotive multistage transmission according to claim 7, wherein when the first rotary member and the second rotary member of the fourth planetary gear set are variably connected, a second clutch forms a variable connection structure.

11. An automotive multistage transmission comprising:

a first planetary gear set, a second planetary gear set, a third planetary gear set, and a fourth planetary gear set, each of the first, second, third and fourth planetary gear sets comprising first, second and third rotary members;

six shifting members variably providing a friction force; and eight rotary shafts selectively connected to the first, second and third rotary members of the first, second, third, and fourth planetary gear sets, wherein a first rotary shaft of the eight rotary shafts is an input shaft directly connected to the second rotary member of the second planetary gear set, a second rotary shaft of the eight rotary shafts is directly connected to the first rotary member of the first planetary gear set, the third rotary member of the second planetary gear set, and the first rotary member of the third planetary gear set, a third rotary shaft of the eight rotary shafts is directly connected to the third rotary member of the first planetary gear set, a fourth rotary shaft of the eight rotary shafts is directly connected to the second rotary member of the first planetary gear set, the third rotary member of the third planetary gear set, and the second rotary member of the fourth planetary gear set, a fifth rotary shaft of the eight rotary shafts is directly connected to the first rotary member of the secondary planetary gear set, a sixth rotary shaft of the eight rotary shafts is directly connected to the second rotary member of the third planetary gear set, a seventh rotary shaft of the eight rotary shafts is directly connected to the first rotary member of the fourth planetary gear set, and an eighth rotary shaft of the eight rotary shafts is an output shaft directly connected to the third rotary member of the fourth planetary gear set; and wherein in the six shifting members, a first clutch is disposed between the first rotary shaft and the seventh rotary shaft, a second clutch is disposed between the fourth rotary shaft and the eighth rotary shaft, a third clutch is disposed between the second rotary shaft and a transmission case, a fourth clutch is disposed between the third rotary shaft and the transmission case, a fifth clutch is disposed between the fifth rotary shaft and the sixth rotary shaft, and a sixth clutch is disposed between the fifth rotary shaft and the seventh rotary shaft.

12. The automotive multistage transmission according to claim 11, wherein the first planetary gear set, the second planetary gear set, the third planetary gear set, and the fourth planetary gear set are sequentially arranged in an axial direction of the input shaft and the output shaft.

13. The automotive multistage transmission according to claim 12, wherein the first clutch variably connects the second rotary member of the second planetary gear set and the first rotary member of the fourth planetary gear set to each other, the second clutch variably connects the third rotary member of the third planetary gear set and the third rotary member of the fourth planetary gear set, the fifth clutch variably connects the first rotary member of the second planetary gear set and the second rotary member of the third planetary gear set, and the sixth clutch variably connects the first rotary member of the second planetary gear set and the first rotary member of the fourth planetary gear set.

* * * * *